US009837043B1

(12) United States Patent
Patel

(10) Patent No.: US 9,837,043 B1
(45) Date of Patent: Dec. 5, 2017

(54) METHODS AND SYSTEMS FOR RENDERING IMAGES USING WIRELESSLY RECEIVED CONFIGURATION PARAMETERS

(71) Applicant: OCULUS VR, LLC, Menlo Park, CA (US)

(72) Inventor: Nirav Patel, San Francisco, CA (US)

(73) Assignee: OCULUS VR, LLC, Menlo Park, CA (US)

(*) Notice: Subject to any disclaimer, the term of this patent is extended or adjusted under 35 U.S.C. 154(b) by 0 days.

(21) Appl. No.: 14/948,118

(22) Filed: Nov. 20, 2015

(51) Int. Cl.
  *G06G 5/00* (2006.01)
  *G09G 5/00* (2006.01)
  *H04W 4/00* (2009.01)
  *G06T 19/00* (2011.01)
  *G02B 27/01* (2006.01)
  *H04W 88/02* (2009.01)

(52) U.S. Cl.
  CPC ......... *G09G 5/006* (2013.01); *G02B 27/0172* (2013.01); *G06T 19/006* (2013.01); *H04W 4/008* (2013.01); *G02B 2027/0178* (2013.01); *G09G 2370/16* (2013.01); *H04W 88/02* (2013.01)

(58) Field of Classification Search
  CPC .......... G02B 27/017; G02B 2027/0178; G02B 27/0172; G02B 2027/014; G02B 27/0101; G02B 27/0176; G02B 7/12; G02B 26/0833; G02B 2027/0156; G02B 27/2214; G02B 13/0015; G02B 27/40; G02B 7/36; G06F 3/012; H04N 13/042
  See application file for complete search history.

(56) References Cited

U.S. PATENT DOCUMENTS

| | | | | |
|---|---|---|---|---|
| 2015/0238762 A1* | 8/2015 | Pal | ........................ | A61N 1/0476 607/45 |
| 2016/0011425 A1* | 1/2016 | Thurber | .................. | G02B 27/64 345/8 |
| 2016/0026253 A1* | 1/2016 | Bradski | ................. | G02B 27/225 345/8 |
| 2016/0363770 A1* | 12/2016 | Kim | .................... | G02B 27/0172 |
| 2017/0031164 A1* | 2/2017 | Costa | .................... | G02B 27/028 |

* cited by examiner

*Primary Examiner* — Zhengxi Liu
*Assistant Examiner* — Raffi Isanians
(74) *Attorney, Agent, or Firm* — Morgan, Lewis & Bockius LLP

(57) ABSTRACT

A mobile device has a display, one or more processors, and first memory storing instructions for execution by the one or more processors. The mobile device is configured to dock in a headset to form a head-mounted display. A near-field-communication (NFC) channel is established with a tag in the headset, the tag including second memory that stores one or more configuration parameters for the headset. The one or more configuration parameters are received from the tag via the NFC channel. Using the one or more configuration parameters for the headset, the mobile device renders virtual-reality images and displays the rendered virtual-reality images.

19 Claims, 11 Drawing Sheets

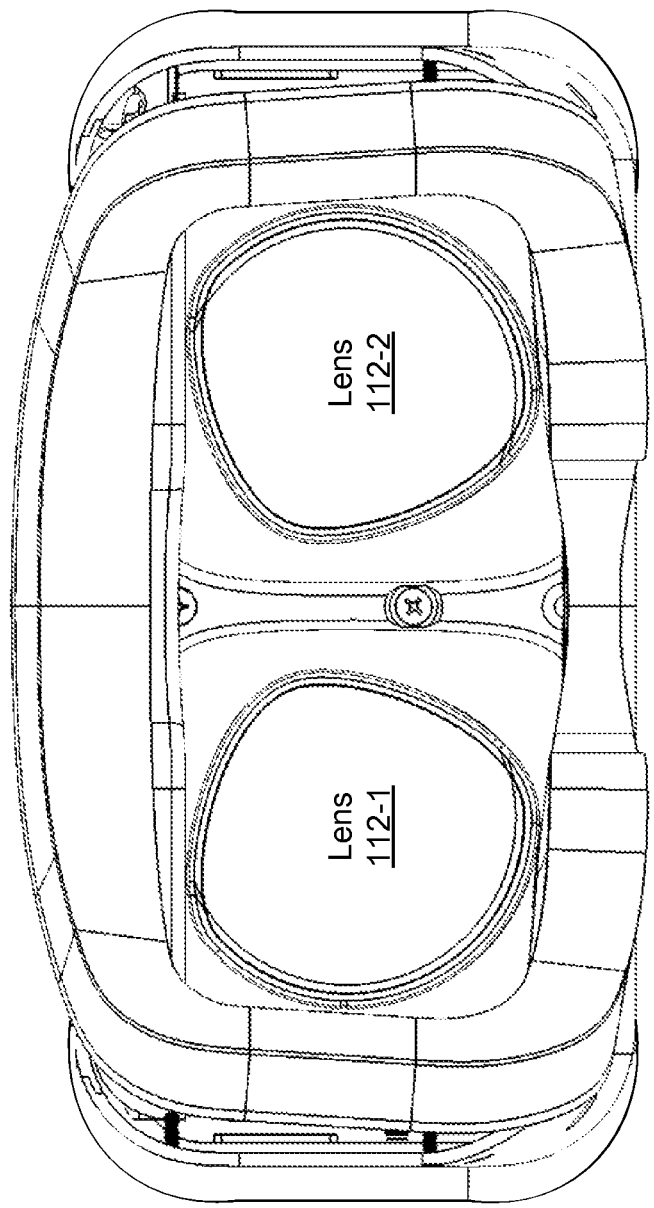

METHODS AND SYSTEMS FOR RENDERING IMAGES USING WIRELESSLY RECEIVED CONFIGURATION PARAMETERS

TECHNICAL FIELD

This application relates generally to wearable technology and virtual-reality technology, including but not limited to rendering virtual-reality images using configuration parameters wirelessly received from a tag in a headset.

BACKGROUND

Virtual-reality head-mounted displays have wide applications in various fields, including engineering design, medical surgery practice, military simulated practice, and video gaming. Some head-mounted displays, which comprise a mobile device for rendering and displaying images and a headset configured to dock with the mobile device, are designed such that headsets are compatible with various mobile devices.

Because mobile devices may be used in a variety of different headsets, configuration parameters for a particular headset being used are desirable to improve (e.g., optimize) rendering performance of a docked mobile device. However, headsets often lack the ability to both store and provide such configurations parameters to the mobile devices with which they are docked.

SUMMARY

Accordingly, there is a need for methods, systems, and interfaces for rendering virtual-reality images using configuration parameters wirelessly received from a tag in a headset. By establishing a wireless communications channel with a tag in a headset upon docking, a mobile device can receive configuration parameters for the headset stored in the memory of the tag. Thereafter, the mobile device may render and display virtual-reality images in accordance with the received configuration parameters. Other information pertaining to an initiated virtual-reality session may also be sent to and stored within the memory of the tag.

In accordance with some embodiments, a method is performed at a mobile device (e.g., a smart phone) having a display, one or more processors, and first memory storing instructions for execution by the one or more processors. The mobile device is configured to dock in a headset to form a head-mounted display. The method includes establishing a near-field-communication (NFC) channel with a tag in the headset, the tag including second memory that stores one or more configuration parameters for the headset. The one or more configuration parameters are received from the tag via the NFC channel. Furthermore, the mobile device renders virtual-reality images using the one or more configuration parameters for the headset, and displays the rendered virtual-reality images.

In accordance with some embodiments, a mobile device includes a display, one or more processors, memory, and one or more programs; the one or more programs are stored in the memory and configured to be executed by the one or more processors. The one or more programs include instructions for performing the operations of the method described above. In accordance with some embodiments, a non-transitory computer-readable storage medium has stored therein instructions that, when executed by the mobile device, cause the mobile device to perform the operations of the method described above.

In accordance with some embodiments, a method is performed at a headset configured to dock a mobile device having a display to form a head-mounted display. The method includes establishing an NFC channel between the mobile device and a tag in the headset, the tag including memory that stores one or more configuration parameters for the display. Furthermore, the one or more configuration parameters are transmitted from the tag to the mobile device via the NFC channel, wherein the one or more configuration parameters are used for rendering virtual-reality images at the mobile device.

In accordance with some embodiments, a head-mounted display includes: a headset having one or more optical components; a tag in the headset, the tag storing one or more configuration parameters for the one or more optical components of the headset; and a dock to receive a mobile device having a display. The tag is positioned in the headset to provide the configuration parameters to the mobile device using NFC when the mobile device is secured in the dock.

Thus, mobile devices are provided with efficient methods for rendering virtual-reality images using wirelessly received configuration parameters, thereby increasing the effectiveness, efficiency, and user satisfaction with such devices.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

FIG. 1C is a back view of a head-mounted display system in accordance with some embodiments.

DESCRIPTION OF EMBODIMENTS

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first memory could be termed a second memory, and, similarly, a second memory could be termed a first memory, without departing from the scope of the various described embodiments. The first memory and the second memory are both memories, but they are not the same memory.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

FIGS. 1A-1E are various views of a head-mounted display system 100, in accordance with some embodiments.

Figure 1A:
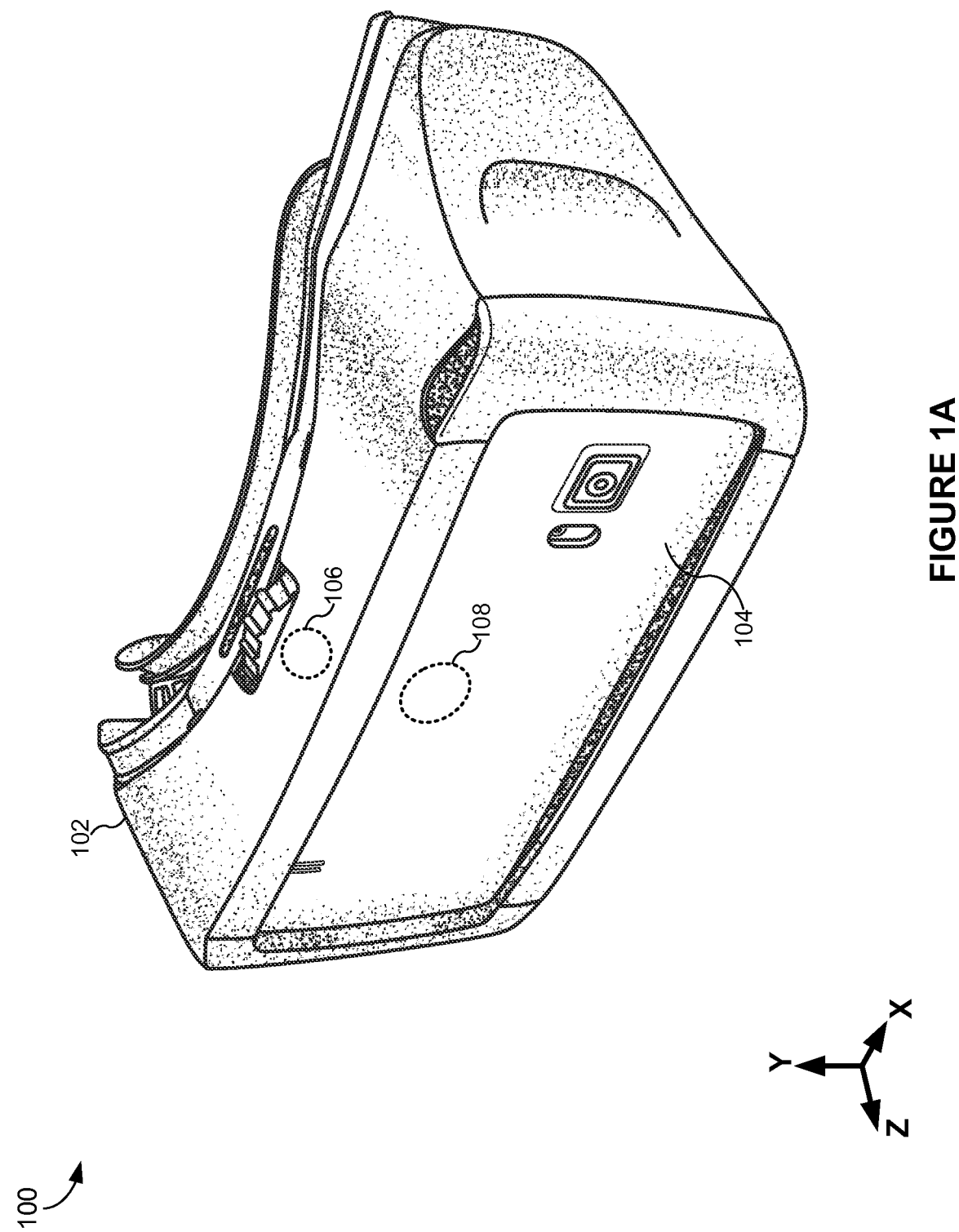
FIG. 1A is a perspective view of a head-mounted display system in accordance with some embodiments.

FIG. 1A is a perspective view of the head-mounted display system 100. In some embodiments, the head-mounted display system 100 comprises a headset 102 having one or more optical components (e.g., lenses 112, shown in the back view of FIG. 1C), a tag 106 in the headset, and a dock 116 to receive a mobile device 104 having a display (shown in the front view of FIG. 1D in which the mobile device is partially undocked). The tag 106 stores one or more configuration parameters for the one or more optical components of the headset 102, and the tag 106 is positioned in the headset 102 to provide the configuration parameters to the mobile device 104 using a wireless communications channel (e.g., a near-field communication (NFC) channel) when the mobile device is secured in the dock. As shown, the mobile device 104 is docked in the headset 102 such that the display of the mobile device faces inward for a user to view. Images rendered on the display of the mobile device provide a virtual-reality experience to a user wearing the head-mounted display system 100. By utilizing the tag 106, various types of data may be stored and transmitted for improving (e.g., optimizing) use of the head-mounted display system 100 in providing the virtual-reality experience (e.g., as described in greater detail with respect to FIGS. 4A-4D).

In some embodiments, the mobile device 104 is a computing device such as a smart phone, personal digital assistant, portable media player, tablet computer, 2D gaming device, 3D (e.g., virtual reality) gaming device, and/or other appropriate computing device that can be used to render and display images, video, or other multimedia. When wearing the headset 102, users view rendered images on the docked mobile device 104 through the optical components of the headset (e.g., lenses 112, FIG. 1C).

The mobile device 104 includes one or more communications interfaces 204 (FIG. 2) through which the mobile device transmits data to, receives data from, or otherwise interfaces with, the tag 106 and/or the headset 102. For example, as shown in FIG. 1A, the mobile device 104 includes an NFC interface 108 that is configured to establish a wireless communications channel with the tag 106. Furthermore, as shown in FIG. 1D, the mobile device 104 couples with the headset 102 via an optional connector 114 (e.g., USB) in the dock 116 in order to establish a wired communications channel with the headset 102.

In some embodiments, the tag 106 includes memory (e.g., memory 316, FIG. 3) and other electrical circuitry (e.g., transmitter, antenna, etc.) for storing, transmitting, and/or receiving various types of data. In some embodiments, the tag 106 and the wireless communications interface of the mobile device (e.g., NFC interface 108) are based on a specified wireless communications protocol (e.g., NFC, RFID, Bluetooth, ZigBee, etc.). Based at least in part on a corresponding wireless communications protocol, the tag 106 and the wireless communications interface operate in accordance with a specified operating frequency (e.g., 13.56 MHz), bit rate (e.g., 424 kbit/s), threshold range (e.g., within 4 cm, or within 20 cm), and/or power consumption (e.g., less than 15 mA for a read operation).

In some embodiments, the tag 106 is a passive device that modulates and draws its operating power from a carrier field provided by an initiating device (e.g., NFC interface 108 of the mobile device 104). Thus, the tag 106 acts as a transponder by emitting electromagnetic signals in response to signals received from the initiating device. In other embodiments, the tag 106 is an active device (e.g., battery powered) that generates its own electromagnetic field. In these systems, the tag 106 and the initiating device (e.g., NFC interface 108 of the mobile device 104) deactivate their respective electromagnetic fields while waiting for data transmissions from the other.

In some embodiments, the tag 106 is a removable device that is not permanently fixed into or onto the headset 102. In alternative embodiments, the tag 106 is integrated into the headset 102. In some embodiments, the tag 106 is positioned in or on the headset such that the tag is within a threshold distance from the wireless communications interface (e.g., NFC interface 108) of the mobile device 104 when docked, allowing for a wireless communications (e.g., NFC) channel to be established and data to be transferred between the tag and the mobile device.

The tag 106 stores (e.g., in memory 316, FIG. 3) data related to the use of and/or for configuring the head-mounted display system 100 for a virtual-reality experience. In some embodiments, the tag 106 stores configuration parameters for the headset 102 (e.g., lens spacing parameters, distortion parameters, etc.), in accordance with which images are rendered on the mobile device 104. The tag 106 may also store data (e.g., statistical data, error data, etc.) tracking use of the head-mounted display system 100. Various types of data stored in the tag 106 and their use with respect to the head-mounted display system 100 are described in greater detail with reference to FIGS. 4A-4D.

Figure 1D:
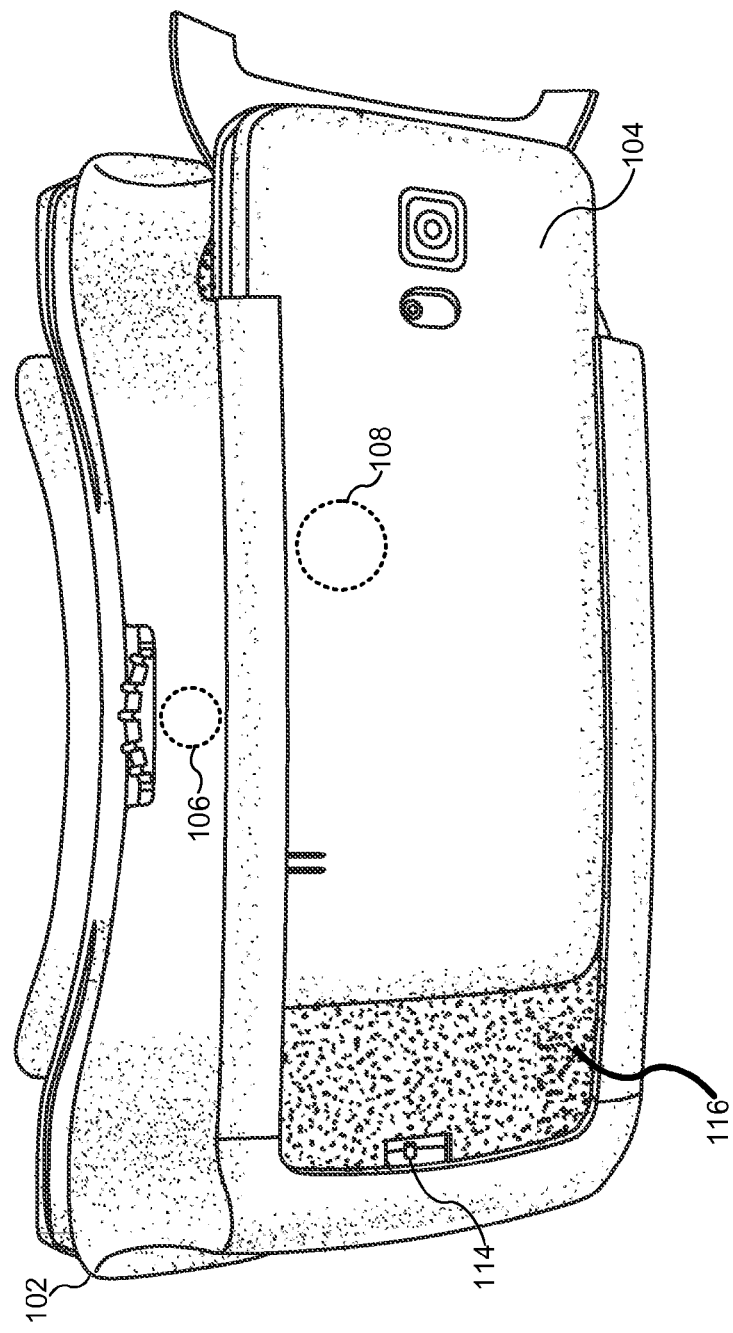
FIG. 1D is a front view of a head-mounted display system in accordance with some embodiments.
Figure 2:
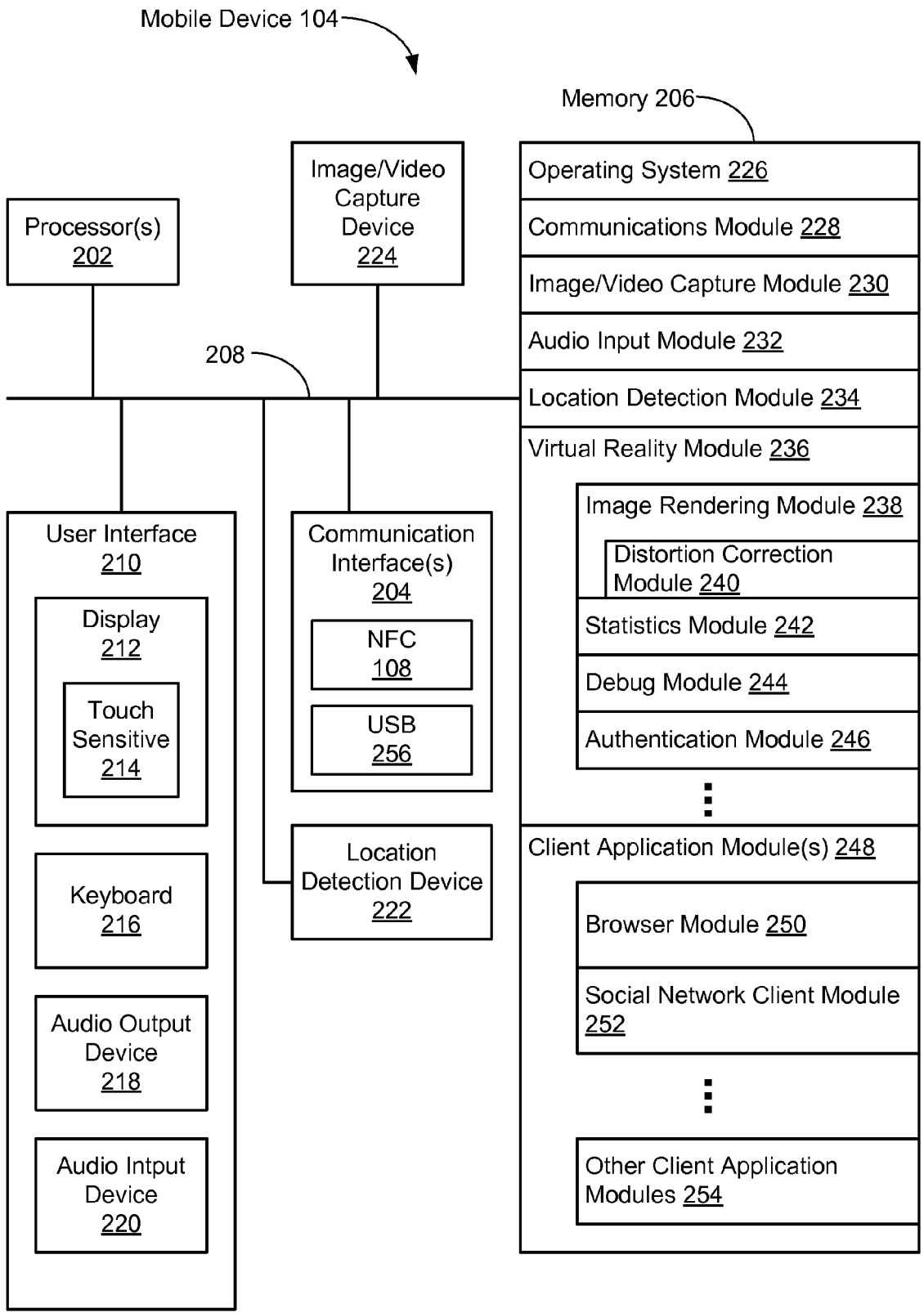
FIG. 2 is a block diagram illustrating a mobile device in accordance with some embodiments.

In some embodiments, the headset 102 also includes optional devices and circuitry for use by the mobile device 104 in providing the virtual-reality experience. For example, the headset 102 includes one or more sensors 312 (FIG. 3) (e.g., gyroscopes, accelerometers) which obtain and provide sensor readings to the mobile device 104 for use in image or video rendering. The sensor readings may be transmitted to the mobile device 104 through the optional connector 114 (FIG. 1D) to the USB interface 256 of the mobile device (FIG. 2). In some embodiments, various electrical connection mechanisms (e.g., flat flexible circuits and/or electric cables) are used in the head-mounted display system 100 to provide power management, signal transmission, and/or other functionalities to the mobile device 104 and the headset 102. In some embodiments, the headset 102 is either configured entirely for wireless communications (e.g., using tag 106) with the mobile device 104.

Figure 1B:
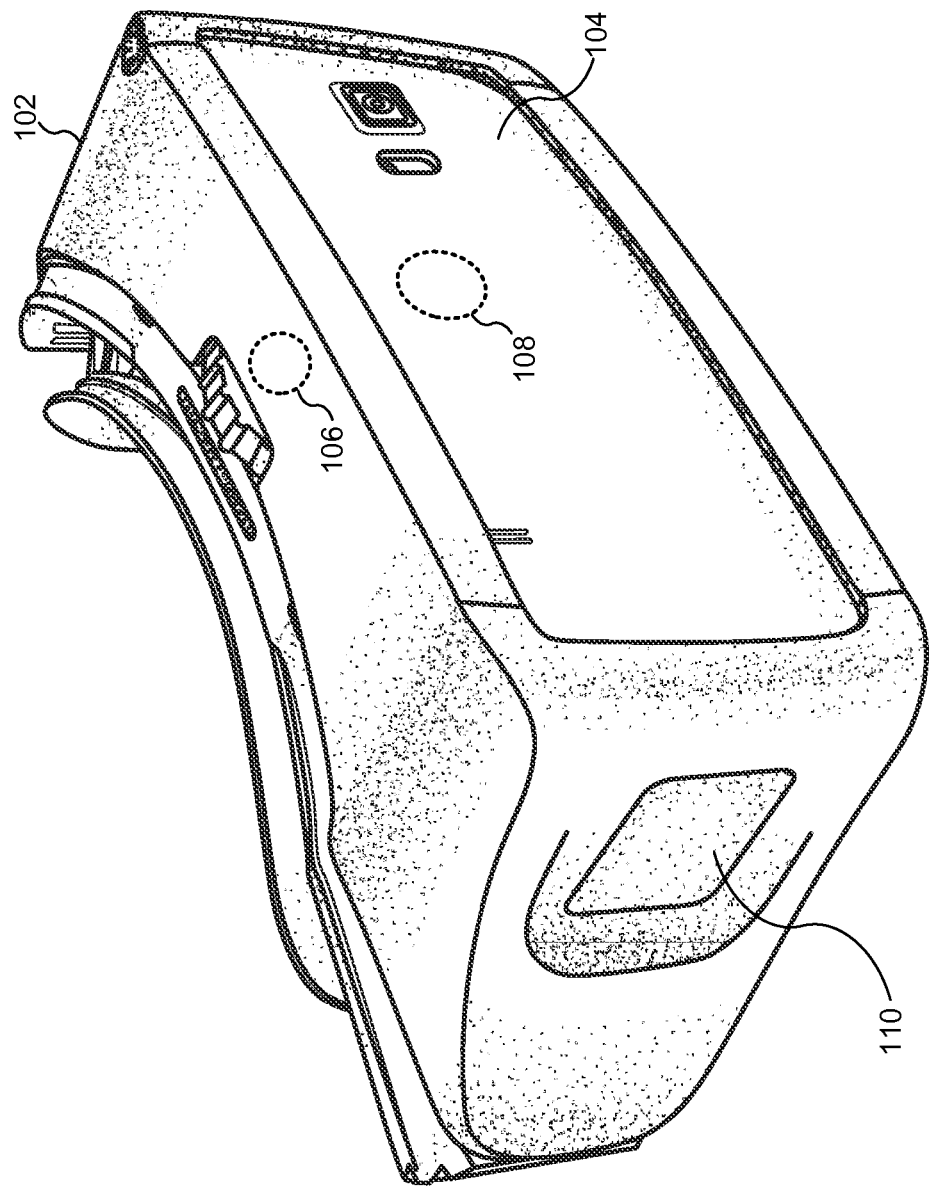
FIG. 1B is another perspective view of a head-mounted display system in accordance with some embodiments.

FIG. 1B is another perspective view of the head-mounted display system 100. In addition to the components shown in FIG. 1A, the view here illustrates an optional button 110 built into the headset 102. In some cases the button 110 may provide directional control to a user for manipulating a rendered virtual-reality experience. The button 110 may also enable a user to access an interrupt routine, where detecting activation of the button 110 triggers the execution of instructions (e.g., stored in memory 316 of tag 106, FIG. 3). Data is then transmitted to and/or retrieved from the mobile device 104 via a wireless communication channel (e.g., NFC channel) in response to activation of the button 110 and execution of the interrupt routine.

FIG. 1C is a back view of the head-mounted display system 100. As shown, in some embodiments, the headset 102 includes one or more optical components for viewing a display device docked in the headset 102, such as a mobile device 104. Here, the headset 102 includes lenses 112-1 and 112-2 positioned apart by a lens spacing distance. Given natural variations arising from the manufacturing process, the lenses 112 also have distortions values corresponding to a respective degree of optical aberration. In some embodiments, the lens spacing and distortion values are stored in the tag 106 as configurations parameters that may be transmitted to the mobile device 104 for use in rendering virtual-reality images. The mobile device uses received configuration parameters in its rendering process to reverse the distortion, such that rendered images and video are calibrated with respect to particular optical characteristics of the lenses 112.

FIG. 1D is a front view of the head-mounted display system 100. The mobile device is shown partially uncoupled from the dock 116 of the headset 102.

The optional connector 114 provides a wired connection for transferring data between the headset 102 and the mobile device 104 when docked. As previously described, sensor readings obtained by optional sensors of the headset 102 (e.g., gyroscopes, accelerometers, etc.) may be transferred directly to the mobile device 104 through the connector 114.

In some embodiments, the headset 102 optionally includes memory (e.g., memory 306, FIG. 3) outside of the tag 106 storing data received from and/or for transmission to the mobile device 104. Additionally and/or alternatively, any of the data described with respect to the tag 106 (e.g., configuration parameters, statistical data, etc.) may be stored in the memory of the headset 102.

Figure 1E:
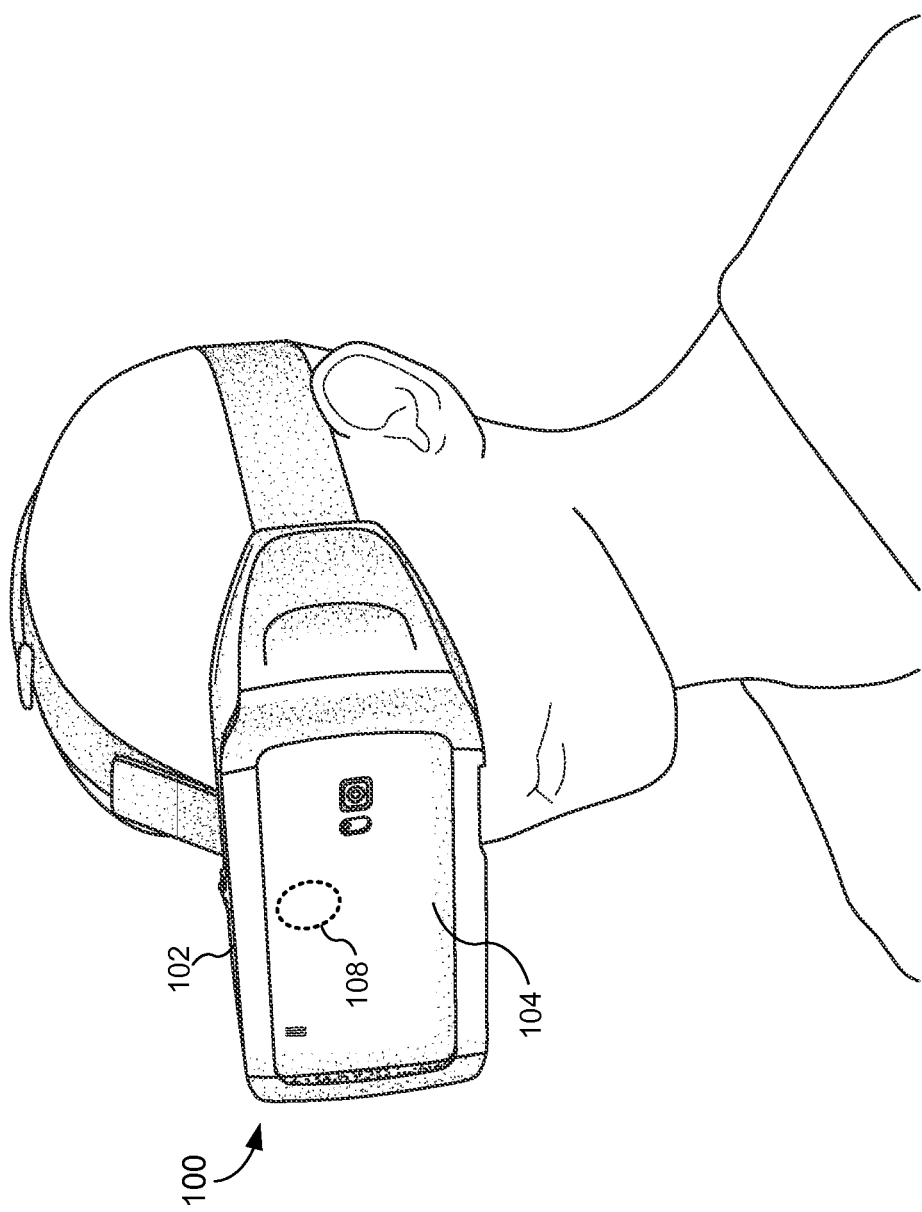
FIG. 1E illustrates an environmental view of a head-mounted display system 100 in use in accordance with some embodiments.

FIG. 1E illustrates an environmental view of the head-mounted display system 100 in use. As shown, the head-mounted display system 100 is strapped to a user during operation. While in use, the mobile device 104 is docked and positioned such that data may be communicated between components of the head-mounted display system 100 through wired (e.g., USB) and/or wireless (e.g., NFC) communications interfaces, where the data may be used to improve (e.g., optimize) the rendering and display performance of the mobile device 104.

FIG. 2 is a block diagram illustrating a mobile device 104 in accordance with some embodiments. The mobile device 104 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The mobile device 104 includes a user interface 210. The user interface 210 includes a display device 212. In some embodiments, the mobile device 104 includes inputs such as a keyboard and/or other input buttons 216. Alternatively or in addition, in some embodiments, the display device 212 includes a touch-sensitive surface 214, in which case the display device 212 is a touch-sensitive display. In mobile devices that have a touch-sensitive display 212, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some mobile devices 104 use a microphone and voice recognition to supplement or replace the keyboard. Optionally, the mobile device 104 includes an audio input device 220 (e.g., a microphone) to capture audio (e.g., speech from a user). Optionally, the mobile device 104 includes a location detection device 222, such as a GPS (global positioning satellite) or other geo-location receiver, for determining the location of the mobile device 104. The mobile device 104 also optionally includes an image/video capture device 224, such as a camera or webcam.

In some embodiments, the communications interface(s) 204 includes wireless and/or wired interfaces for receiving data from and/or transmitting data to the tag 106, the headset 102, and/or one or more components thereof. In some embodiments, data communications are carried out using any of a variety of custom or standard wireless protocols (e.g., NFC, RFID, IEEE 802.15.4, Wi-Fi, ZigBee, 6LoW-PAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the communications interface(s) 204 includes an NFC interface 108 for enabling wireless data communications with tags (e.g., tag 106) or other NFC-compatible devices. Furthermore, in some embodiments, the communications interface(s) 204 includes a USB interface 256 for enabling wired data communications with a connected device (e.g., headset 102, to which the mobile device 104 is coupled via the optional connector 114 when docked).

Memory 206 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 206 may optionally include one or more storage devices remotely located from the processor(s) 202. Memory 206, or alternatively the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:

- an operating system 226 that includes procedures for handling various basic system services and for performing hardware dependent tasks;
- a network communication module 228 that is used for communicably connecting the mobile device 104 to other computers or devices (e.g., tag 106, headset 102, etc.) via the one or more communication network interfaces 204 (wired or wireless);
- an image/video capture module 230 (e.g., a camera module) for processing a respective image or video captured by the image/video capture device 224;
- an audio input module 232 (e.g., a microphone module) for processing audio captured by the audio input device 220;
- a location detection module 234 (e.g., a GPS, Wi-Fi, or hybrid positioning module) for determining the location of the mobile device 104 (e.g., using the location detection device 222) and providing this location information for use in various applications (e.g., social network client module 252);
- a virtual reality module 236 for accessing, manipulating, and displaying virtual content (e.g., a virtual-reality session), including the following modules (or sets of instructions), or a subset or superset thereof:
  - an image rendering module 238 for rendering virtual-reality images and/or video using one or more configuration parameters (e.g., for a headset 102), the image rendering module including a distortion correction module 240 for reversing a specified distortion of an optical component (e.g., lenses of the headset 102) in accordance with some embodiments;
  - a statistics module 242 for determining and storing (by wirelessly sending to a tag 106) statistical data indicating usage statistics (e.g., duration of a virtual-reality session for a user) of a headset 102;
  - a debug module for determining and storing (e.g., by wirelessly sending to a tag 106) error data indicating any malfunctions that occur during the rendering or displaying of virtual-reality images by a mobile device 104 (e.g., a type of malfunction); and
  - an authentication module 246 for determining whether a mobile device 104 is authorized to pair with a headset 102 (with which the mobile device 104 is docked) based on received authentication keys; and
- one or more client application modules 248, including the following modules (or sets of instructions), or a subset or superset thereof:
  - a web browser module 250 (e.g., Internet Explorer by Microsoft, Firefox by Mozilla, Safari by Apple, or Chrome by Google) for accessing, viewing, and interacting with web sites (e.g., a web site providing virtual content),
  - a social network client module 252 for providing an interface to a social-networking service and related features; and/or
  - other optional client application modules 254, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
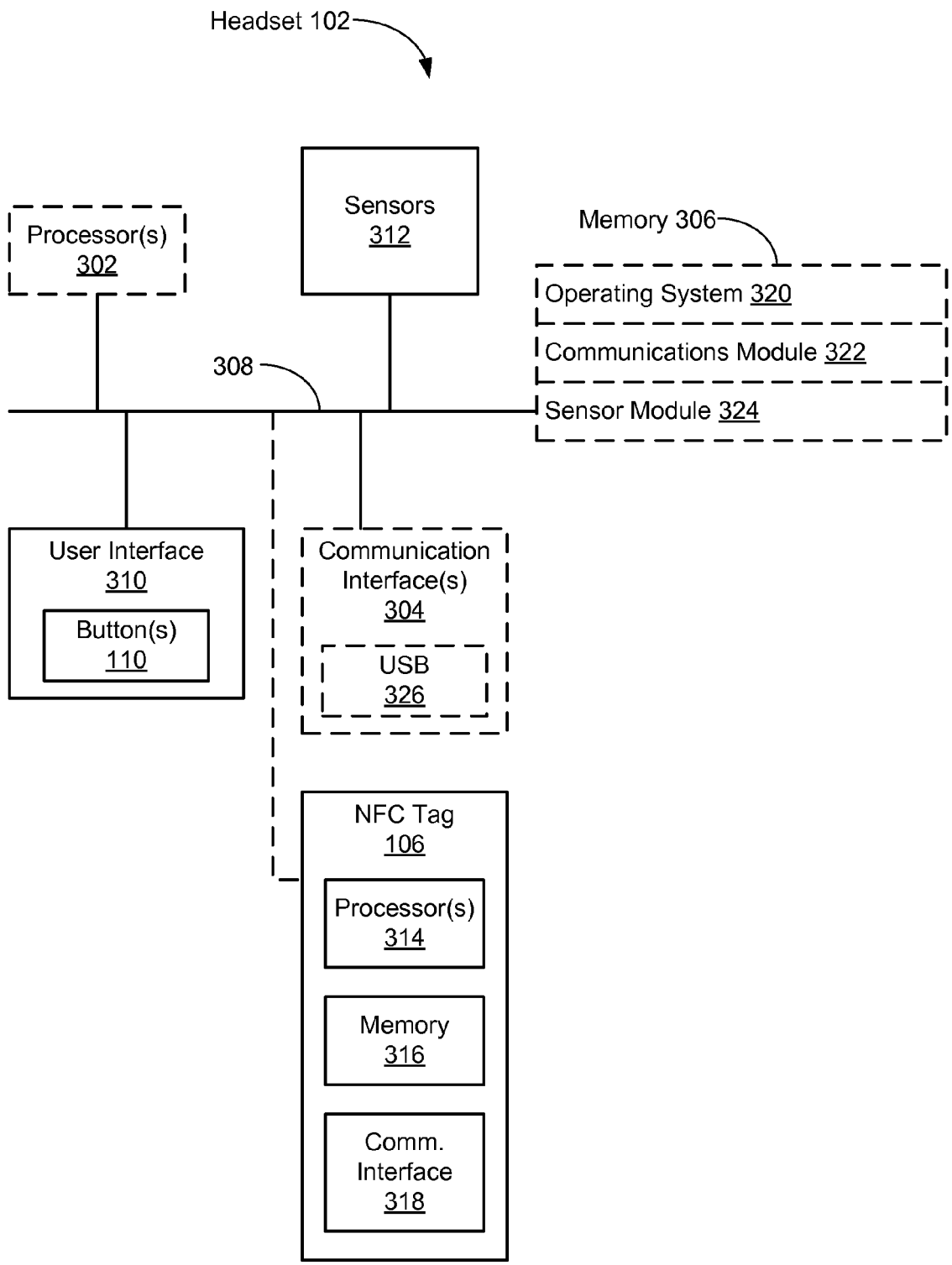
FIG. 3 is a block diagram illustrating a headset in accordance with some embodiments.

FIG. 3 is a block diagram illustrating an exemplary headset 102 in accordance with some embodiments. The headset 102 includes one or more optional processing units (processors or cores) 302, one or more network or other communications interfaces 304, optional memory 306, and one or more communication buses 308 for interconnecting these components. The communication buses 308 optionally include circuitry (sometimes called a chipset) that interconnects and controls communications between system components.

In some embodiments, the headset 102 has a user interface 310 that includes inputs such as one or more input buttons 110 (FIG. 1B). In some embodiments, the buttons 110 provide directional control to a user (e.g., to manipulate some aspect of a rendered virtual-reality experience). In some embodiments, activating the button 110 enables a user to access an interrupt routine that triggers execution of stored instructions (e.g., stored in the memory 316 of the tag 106 or the optional memory 306 of the headset 102). Data is then either transmitted to and/or retrieved from the mobile device 104 via a wireless communication channel (an NFC channel).

In some embodiments, the headset 102 includes one or more sensors 312 (e.g., gyroscopes, accelerometers, etc.) which obtain and provide additional sensor readings to the mobile device 104 for use in image and/or video rendering.

In some embodiments, the communications interface(s) 304 includes wireless and/or wired interfaces for receiving data from and/or transmitting data to the tag 106, the headset 102, and/or one or more components thereof (e.g., transmitting sensor readings from the sensors 312). In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, in some embodiments, the communications interface(s) 304 includes an optional USB interface 326 for enabling wired data communications with a connected device (e.g., a mobile device 104 that is docked in a headset 102 and coupled via an optional connector 114).

In some embodiments, the headset includes an NFC tag 106 (FIG. 1A) that includes one or more processing units (processors or cores) 314, a communications interface 318 (e.g., NFC), and/or memory 316 (e.g., non-volatile memory, such as flash memory). In some embodiments, the memory 316 stores various types of data related to the use of and for configuring a system (e.g., head-mounted display system 100) for a virtual-reality experience (e.g., configuration parameters, statistical data, error data, etc., described in greater detail with reference to FIGS. 4A-4D).

The optional memory 306 of the headset 102 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the optional processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 320 that includes procedures for handling various basic system services and for performing hardware dependent tasks;
- a network communication module 322 that is used for communicably connecting the headset 102 to other computers or devices via the one or more communication network interfaces 304 (wired or wireless); and
- a sensor module 324 for storing, processing, and/or transmitting (e.g., to the mobile device 104) sensor readings obtained by the one or more sensors 312.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206, 306, and/or 316 store a subset of the modules and data structures identified above. Furthermore, memory 206, 306, and/or 316 optionally store additional modules and data structures not described above.

FIGS. 4A-4D are flow diagrams illustrating a method 400 of rendering images using configurations parameters received from a tag, in accordance with some embodiments.

The method 400 is performed (402) at a mobile device (e.g., mobile device 104, FIGS. 1A-1E and 2) having a display, one or more processors, and first memory storing instructions for execution by the one or more processors, wherein the mobile device is configured to dock in a headset to form a head-mounted display. An example is shown in FIGS. 1A-1D, where the mobile device 104 is configured to be docked into the headset 102 to form the head-mounted display system 100. The method 400 corresponds to instructions stored in the first memory.

In some embodiments, the mobile device detects (404) that the mobile device is docked in the headset. In some implementations, detecting that the mobile device is docked includes (406) detecting that the mobile device and the headset are communicably coupled via a communication channel distinct from a near-field-communication (NFC) channel. As an example, the mobile device 104 detects that it is docked in the headset 102 when signals are detected through the USB interface 256, where the signals are transmitted between the mobile device and the headset via the optional connector 114 (FIG. 1D).

In some embodiments, the presence of a tag is wirelessly detected (408) in the headset. In some embodiments, the tag is (410) a passive NFC device (e.g., tag 106, FIG. 3). In some embodiments, the tag is a transceiver that broadcasts a beacon signal, where the mobile device 104 detects the presence of the tag by detecting the beacon signal (e.g., using a wireless communications interface). In some embodiments, detection of the tag is (412) in accordance with the tag being within a threshold proximity to the mobile device for NFC communication. That is, if the tag 106 and a wireless communications interface of the mobile device 104 (e.g., NFC interface 108) are separated by a distance within an operating range of the corresponding communications protocol (e.g., 4 cm or 20 cm), the tag 106 is detectable by the mobile device 104 (e.g., by using the NFC interface 108 to transmit a carrier signal and receive a responsive signal from the tag 106). Referring to the example in FIG. 1A, the tag 106 is within a threshold proximity to the NFC interface 108 of the mobile device 104 for NFC communication when the mobile device is docked within the headset 102. In some embodiments, wirelessly detecting (408) the presence of the tag includes continuously polling (e.g., by an NFC interface 108 of a mobile device 104, FIG. 2) for the presence of a tag. The continuous polling may be performed by a background process, or by an application (e.g., in response to executing a virtual reality module 236, FIG. 2). In some embodiments, detecting (step 404) that the mobile device is docked in the headset includes wirelessly detecting (step 408) the presence of the tag in the headset.

In some embodiments, in response to wirelessly detecting (408) the presence of the tag, a user is prompted to initiate a data retrieval process (e.g., retrieving data from the tag 106, described below). The user may be prompted with an image displayed on the mobile device 104 or an audible cue (e.g., a chime). In some embodiments, a user input is detected (414) for initiating a data retrieval process (e.g., activation of the button 110 of the headset 102, FIG. 1B).

Figure 4A:
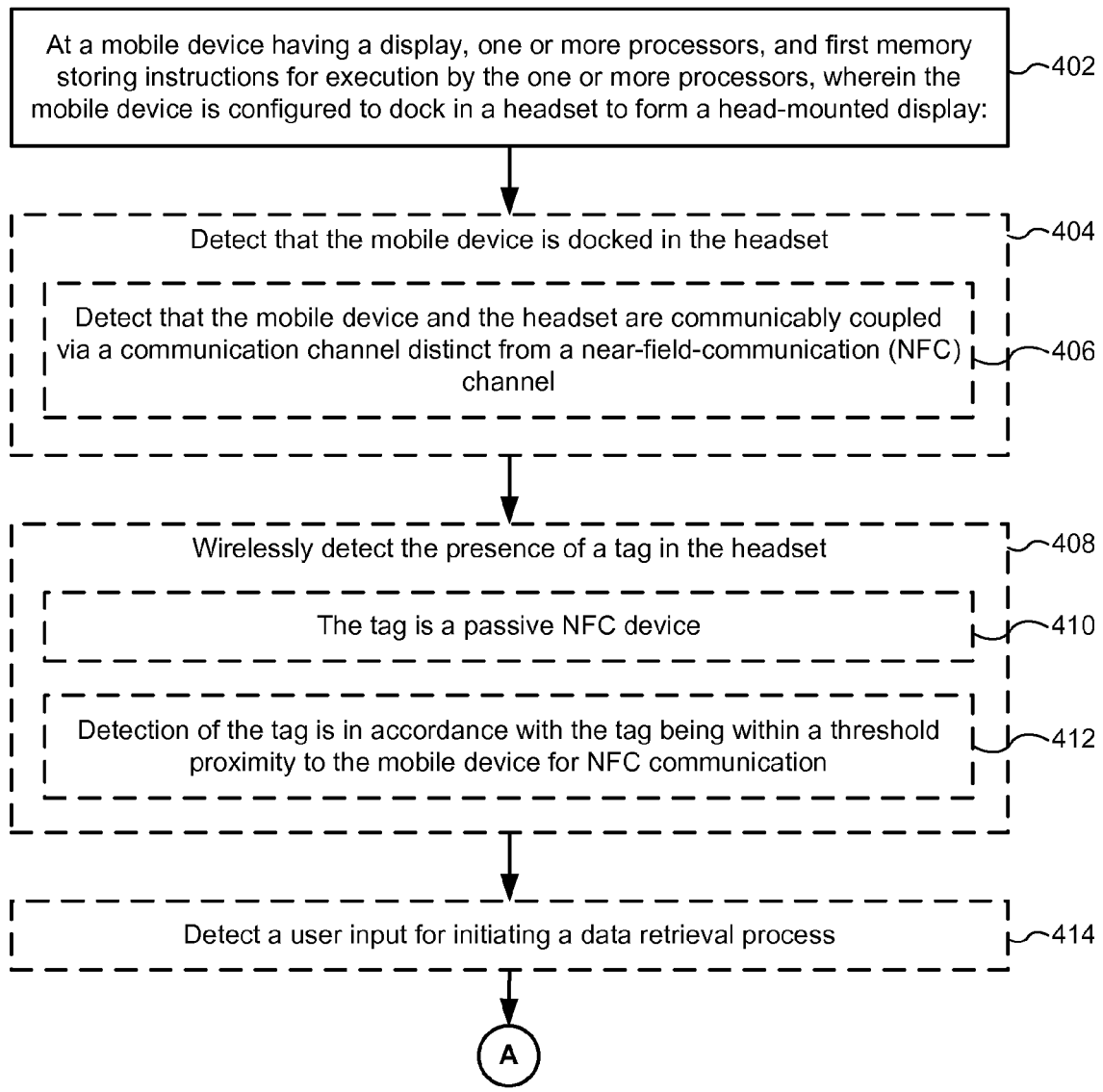
FIGS. 4A-4D are flow diagrams illustrating a method of rendering images using configurations parameters received from a tag in accordance with some embodiments.
Figure 4B:
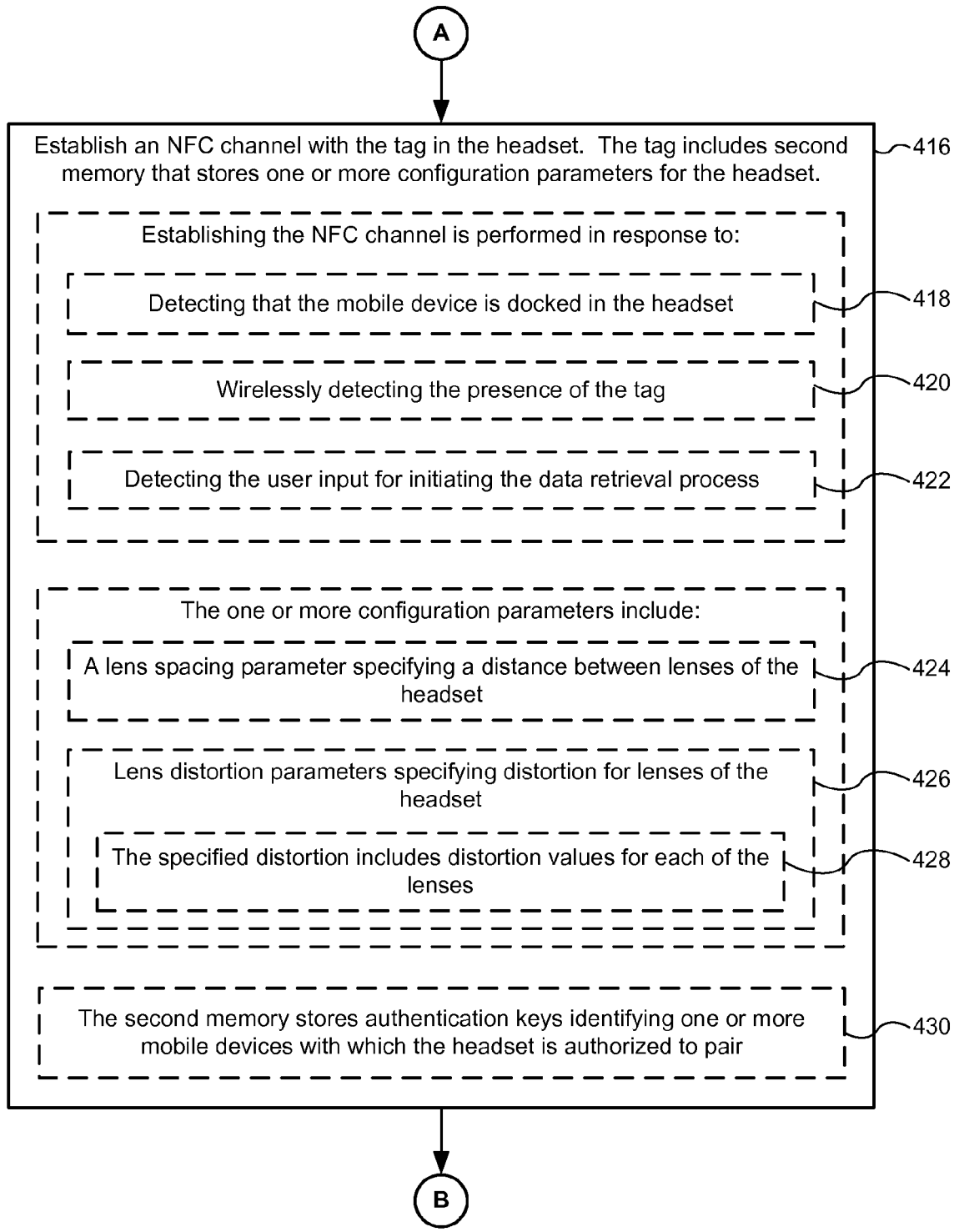

Referring now to FIG. 4B, the mobile device establishes (416) an NFC channel with the tag in the headset (e.g., establishing a wireless communication channel between the NFC interface 108 and the tag 106). The tag includes second memory that stores one or more configuration parameters for the headset.

In some embodiments, establishing the NFC channel is performed in response to detecting (418) that the mobile device is docked in the headset. For example, after the mobile device 104 has been inserted into the dock 116 of the headset 102, an NFC channel is established in response to detecting that the mobile device 104 is docked (step 404, FIG. 4A). In some embodiments, establishing the NFC channel is performed in response to wirelessly detecting (420) the presence of the tag (408, FIG. 4A). That is, the NFC channel is automatically established when the tag 106 is detected by the mobile device 104. In some embodiments, establishing the NFC channel is performed in response to detecting (422) the user input for initiating the data retrieval process (e.g., in response to explicit user authorization to establish the NFC channel, step 414, FIG. 4A).

In some embodiments, the one or more configuration parameters stored in the second memory include (424) a lens spacing parameter specifying a distance between lenses of the headset. For example, the spacing is adjustable (e.g., using a dial on the headset 102) and the lens spacing parameter corresponds to the adjusted spacing. In some embodiments, the one or more configuration parameters include (426) lens distortion parameters specifying distortion for lenses of the headset. In some implementations, the specified distortion includes (428) distortion values for each of the lenses. Furthermore, in some implementations, the specified distortion is for a corresponding lens type of the lenses (e.g., all lenses of the same type are assumed to have the same distortion). Alternatively, the specified distortion is individually measured and recorded (e.g., during manufacturing).

In some embodiments, the second memory of the tag stores (430) authentication keys identifying one or more mobile devices with which the headset is authorized to pair (e.g., PINs, tokens, and/or any other identifying information of the mobile device). In some embodiments, the second memory stores information specifying compatible mobile devices (e.g., device manufacturers, device models, operating systems, software versions, etc.).

Figure 4C:
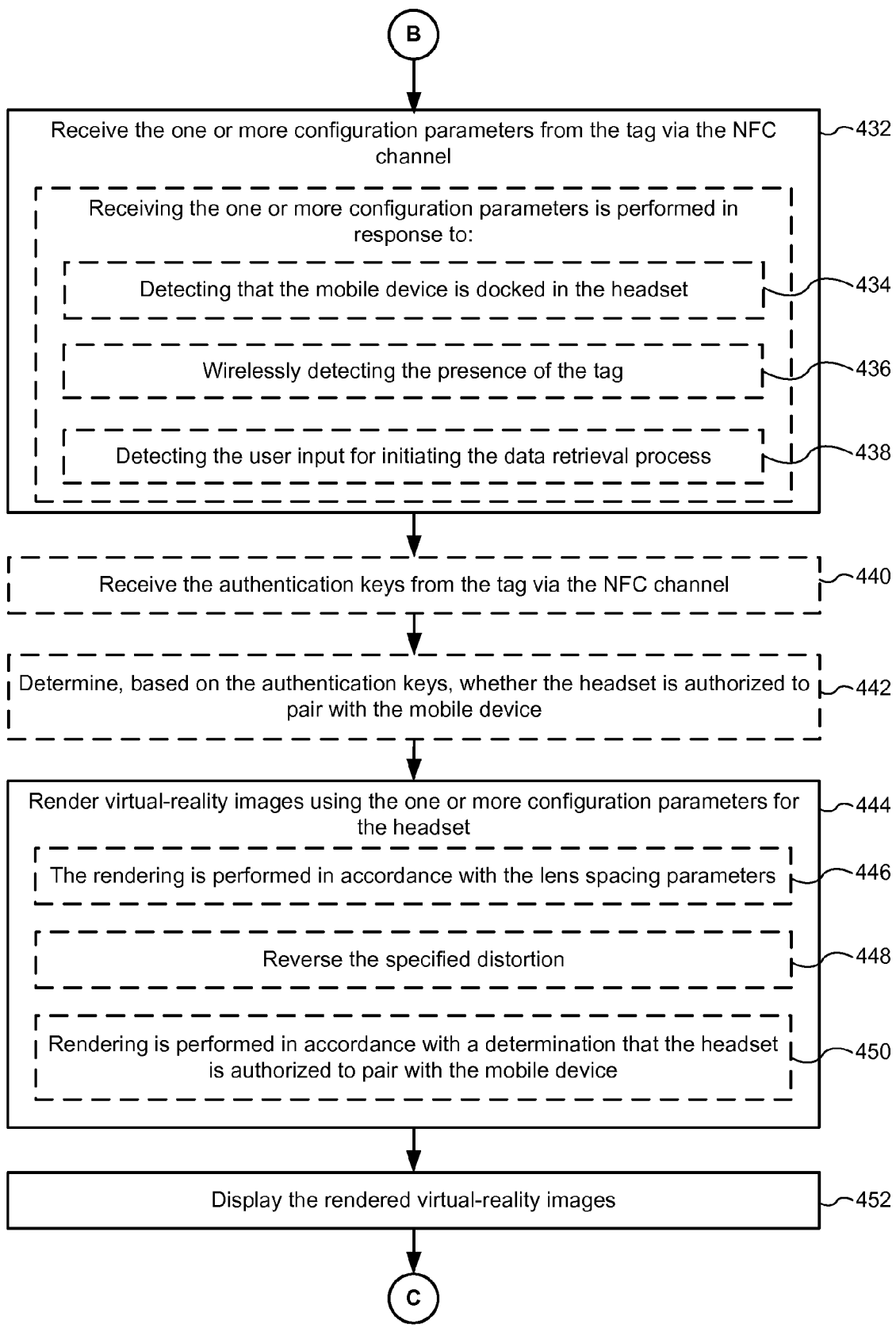

Referring now to FIG. 4C, after the NFC channel is established, the mobile device receives (432) (and the headset transmits) the one or more configuration parameters from the tag via the NFC channel. In some embodiments, the mobile device receives (and the headset transmits) the one or more configuration parameters in response to detecting (434) that the mobile device is docked in the headset (404, FIG. 4A). In some embodiments, the mobile device receives (and the headset transmits) the one or more configuration parameters in response to wirelessly detecting (436) the presence of the tag (408, FIG. 4A). In some embodiments, the mobile device receives (and the headset transmits) the one or more configuration parameters in response to detecting (438) the user input for initiating the data retrieval process (414, FIG. 4A).

In some embodiments, the mobile device receives the one or more configuration parameters via the communication channel distinct from the NFC channel (e.g., USB, using optional connector 114). In some implementations, the one or more configuration parameters are received via the distinct communication channel in response to detecting that the mobile device and the headset are communicably coupled via the distinct communication channel. In further implementations, if the mobile device detects (step 408) the presence of the tag and also detects (step 406) that the mobile device and the headset are communicably coupled via the communication channel distinct from the NFC channel, the one or more configuration parameters are received via the distinct communication channel. In other words, if the mobile device can receive the one or more configuration parameters either wirelessly from the tag (e.g., using NFC) or from the headset via a wired interface (e.g., USB), the mobile device will opt for receiving the one or more configuration parameters from the headset via the wired interface. If a wired interface is not available, the mobile device receives the one or more configuration parameters wirelessly from the tag (e.g., using NFC), in response to determining that the wired interface is not available.

In some embodiments, the authentication keys are received (440) from the tag via the NFC channel. Based on the authentication keys, the mobile device determines (442) whether the headset is authorized to pair with the mobile device. Determining whether the headset is authorized may include comparing the authentication keys against a valid key stored at the mobile device. Additionally and/or alternatively, determining whether the headset is authorized includes the mobile device sending the received authorization keys to a remote server for verification. In some embodiments, authentication is performed before the configuration parameters are sent by the tag and received by the mobile device.

After receiving the one or more configuration parameters, the mobile device renders (444) virtual-reality images using the one or more configuration parameters for the headset, and the mobile device displays (452) the rendered virtual-reality images. In some embodiments, the rendering is performed (446) in accordance with the lens spacing parameters, such that the rendering accounts for the lens spacing. In some embodiments, rendering includes (448) reversing the specified distortion of the lenses. In some embodiments, the rendering is performed (450) in accordance with a determination that the headset is authorized to pair with the mobile device.

Figure 4D:
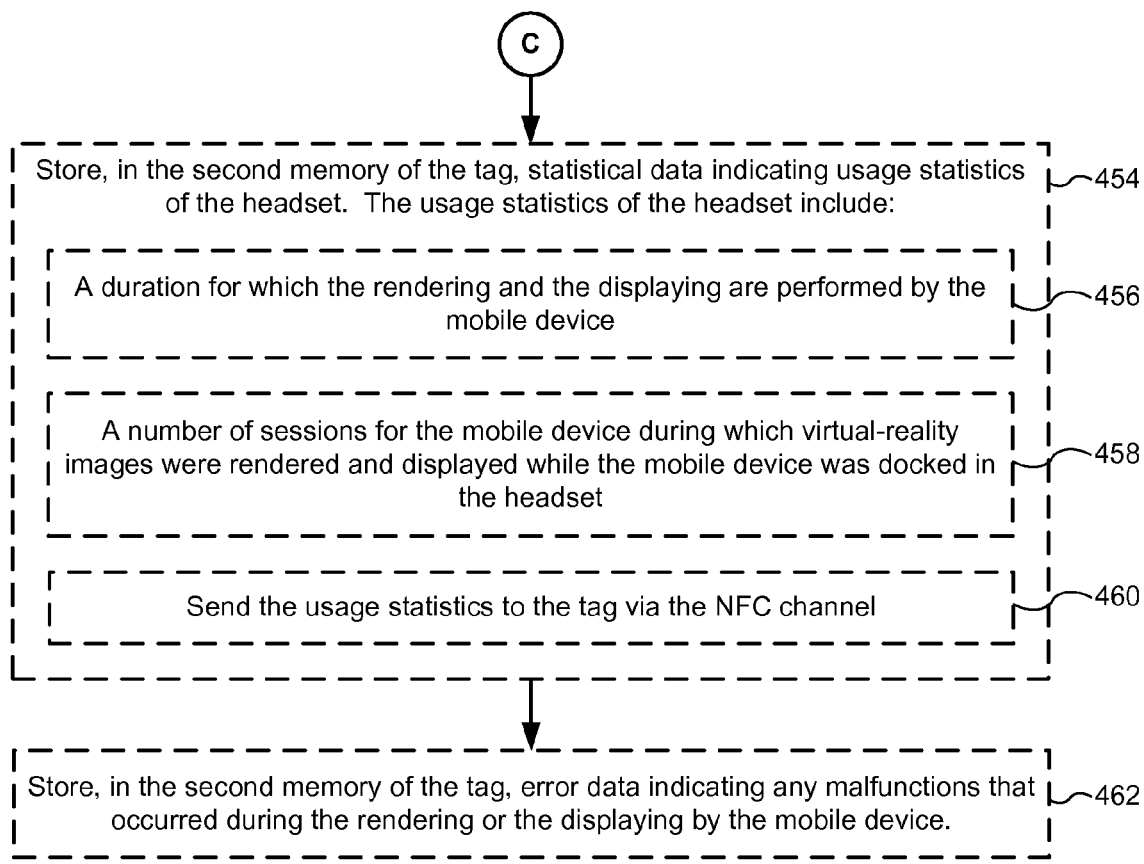

Referring now to FIG. 4D, in some embodiments, the mobile device stores (454), in the second memory of the tag, statistical data indicating usage statistics of the headset. In some embodiments, the usage statistics of the headset include (456) a duration for which the rendering and the displaying are performed by the mobile device. For example, the usage statistics include a total time (e.g., over a user's usage history, over a particular session, etc.) that a user has used the head-mounted display in the context of a virtual-reality experience. In some embodiments, the usage statistics of the headset include (458) a number of sessions for the mobile device during which virtual-reality images were rendered and displayed while the mobile device was docked in the headset (e.g., a total count of virtual-reality sessions initiated by a particular user on the head-mounted display). In some embodiments, the usage statistics of the headset include at least one of device information identifying software characteristics of the mobile device (e.g., operating software version, firmware version, version of a virtual-reality rendering application, etc.), or device information identifying hardware characteristics of the mobile device (e.g., processor/memory specifications, display specifications, etc.). Usage statistics may additionally and/or alternatively include other behavioral or usage statistics of a user related to the use of the head-mounted display for a virtual-reality experience (e.g., logs of sensor readings, location information, etc.).

In some embodiments, the mobile device sends (460) the usage statistics to the tag via the NFC channel for storage in the second memory of the tag. In some embodiments, the mobile device ceases the rendering and the displaying of the virtual-reality images (initiated at steps 444 and 452, FIG. 4C), and the sending (460) is performed after the rendering and the displaying have ceased (e.g., usage statistics are sent after the mobile device finishes timing the total elapsed time since initiating the rendering and displaying for a given virtual-reality session).

In some embodiments, the mobile device stores (462) (e.g., transmits for storage via the NFC channel), in the second memory of the tag, error data indicating one or more (e.g., all) malfunctions that occurred during the rendering or the displaying by the mobile device. Error data may specify, for example, a type of malfunction (e.g., hardware or software), statistics of failed operations while using the head-mounted display (e.g., a number of failed operations), and/or context information related to failed operations (e.g., date/time of failed hardware/software operation).

In some embodiments, the establishing of the NFC channel (step 416, FIG. 4B), the receiving of the one or more configuration parameters (step 432, FIG. 4C), the rendering of the virtual-reality images (step 444, FIG. 4C), and the displaying of the rendered virtual-reality images (step 452, FIG. 4C) are performed when the mobile device is docked in the headset.

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at a mobile device having a display, one or more processors, and first memory storing instructions for execution by the one or more processors, wherein the mobile device is configured to dock in a headset to form a head-mounted display: establishing a near-field-communication (NFC) channel with a tag in the headset, the tag including second memory that stores one or more configuration parameters for the headset, the one or more configuration parameters including lens distortion parameters specifying distortion for lenses of the headset; receiving the one or more configuration parameters, including the lens
   distortion parameters, from the tag via the NFC channel; rendering virtual-reality images using the one or more configuration
   parameters for the headset, comprising reversing the specified distortion; and displaying the rendered virtual-reality images.

2. The method of claim 1, wherein the establishing, receiving, rendering, and displaying are performed when the mobile device is docked in the headset.

3. The method of claim 1, further comprising detecting that the mobile device is docked in the headset, wherein establishing the NFC channel and receiving the configuration parameters are performed in response to the detecting.

4. The method of claim 3, wherein detecting that the mobile device is docked in the headset comprises detecting that the mobile device and the headset are communicably coupled via a communication channel distinct from the NFC channel.

5. The method of claim 1, further comprising wirelessly detecting the presence of the tag, wherein establishing the NFC channel and receiving the configuration parameters are performed in response to wirelessly detecting the presence of the tag.

6. The method of claim 5, wherein detection of the tag is in accordance with the tag being within a threshold proximity to the mobile device for NFC communication.

7. The method of claim 1, further comprising detecting a user input for initiating a data retrieval process, wherein establishing the NFC channel and receiving the configuration parameters are performed in response to detecting the user input.

8. The method of claim 1, wherein the tag is a passive NFC device.

9. The method of claim 1, wherein the one or more configuration parameters for the headset include a lens spacing parameter specifying a distance between lenses of the headset, the rendering being performed in accordance with the lens spacing parameters.

10. The method of claim 1, wherein the specified distortion includes distortion values for each of the lenses.

11. The method of claim 1, further comprising storing, in the second memory, statistical data indicating usage statistics of the headset.

12. The method of claim 11, wherein the usage statistics of the headset include a duration for which the rendering and the displaying are performed by the mobile device, the method further comprising sending the usage statistics to the tag via the NFC channel.

13. The method of claim 11, wherein the usage statistics of the headset include a number of sessions for the mobile device during which virtual-reality images were rendered and displayed while the mobile device was docked in the headset, the method further comprising sending the usage statistics to the tag via the NFC channel.

14. The method of claim 11, wherein the usage statistics of the headset include at least one of:
   device information identifying software characteristics of the mobile device; or device information identifying hardware characteristics of the mobile device.

15. The method of claim 1, further comprising storing, in the second memory, error data indicating a malfunction that occurred during the rendering or the displaying by the mobile device.

16. The method of claim 1, wherein the second memory further stores authentication keys identifying one or more mobile devices with which the headset is authorized to pair.

17. The method of claim 16, further comprising:
   receiving the authentication keys from the tag via the NFC channel; and based on the authentication keys, determining whether the headset is authorized to pair with the mobile device, wherein the rendering is performed in accordance with a determination that the headset is authorized to pair with the mobile device.

18. A method, comprising:
   at a headset configured to dock a mobile device having a display to form a head-mounted display: establishing a near-field-communication (NFC) channel between the mobile device and a tag in the headset, the tag including memory that stores one or more configuration parameters for the display, the one or more configuration parameters including lens distortion parameters specifying distortion for lenses of the headset; and transmitting the one or more configuration parameters, including the lens distortion parameters, from the tag to the mobile device via the NFC channel, wherein the one or more configuration parameters are used for rendering virtual-reality images at the mobile device, the rendering comprising reversing the specified distortion.

19. A head-mounted display, comprising:
   a headset having one or more optical components;
   a tag in the headset, the tag storing one or more configuration parameters for the one or more optical components of the headset, the one or more configuration parameters including lens distortion parameters specifying distortion for lenses of the headset; and a dock to receive a mobile device having a display;
   wherein the tag is positioned in the headset to provide the one or more configuration parameters, including the lens distortion parameters, to the mobile device using near-field-communication (NFC) when the mobile device is secured in the dock to enable the mobile device to reverse the specified distortion when rendering virtual-reality images.

* * * * *